United States Patent

[11] 3,590,927

| [72] | Inventors | Gerardus Johannes Brouwer<br>Keswick, Ontario;<br>John Van Dyken, Newmarket, Ontario;<br>Klaas Oussoren, Newmarket, Ontario, all of, Canada |
|---|---|---|
| [21] | Appl. No. | 861,661 |
| [22] | Filed | Sept. 29, 1969<br>Division of Ser. No. 560,770, June 27, 1966, Pat. No. 3,509,944. |
| [45] | Patented | July 6, 1971 |
| [73] | Assignee | The Ryan Equipment Company<br>St. Paul, Minn.<br>by said Brouwer |

[54] MOUNTING FOR SOD-CUTTING MACHINE
7 Claims, 8 Drawing Figs.
[52] U.S. Cl. ........................................................ 172/19,
172/298, 37/101
[51] Int. Cl. ........................................................ A01b 45/04
[50] Field of Search............................................ 172/20, 21,
22, 101, 298, 309; 198/8, 9, 10, 233; 37/101;
56/33, 35

[56] References Cited
UNITED STATES PATENTS
| 1,960,268 | 5/1934 | Kriegbaum et al. | 172/298 |
| 2,614,477 | 10/1952 | Habenicht | 172/20 |
| 3,245,159 | 4/1966 | MacDonald | 37/101 |
| 3,392,464 | 7/1968 | MacDonald | 37/101 |

FOREIGN PATENTS
| 152,631 | 7/1953 | Australia | 172/298 |

Primary Examiner—Robert E. Pulfrey
Assistant Examiner—Stephen C. Pellegrino
Attorney—Rogers, Bereskin & Parr ABSTRACT: A sod cutter having a vibrating sod undercutting blade. Several thin, flat guide strips, connected to the rear of the blade, extend rearwardly to the front end of a conveyor mounted behind the blade, to guide cut sod from the blade onto the conveyor. A cutoff blade, to cut sod to length, is periodically driven into the ground by springs. A tiltable mounting permits the cutoff blade, as it is slowly raised between strokes by a spiral cam, to tilt rearwardly during times when it drags along the ground.

The sod cutter is guided over the ground by a roller and is mounted on a support vehicle at two pivot points spaced lengthwise along and centrally located widthwise of the cutter. This allows the cutter to rock laterally with its roller independently of the support vehicle, to adjust to local variations in the surface traversed.

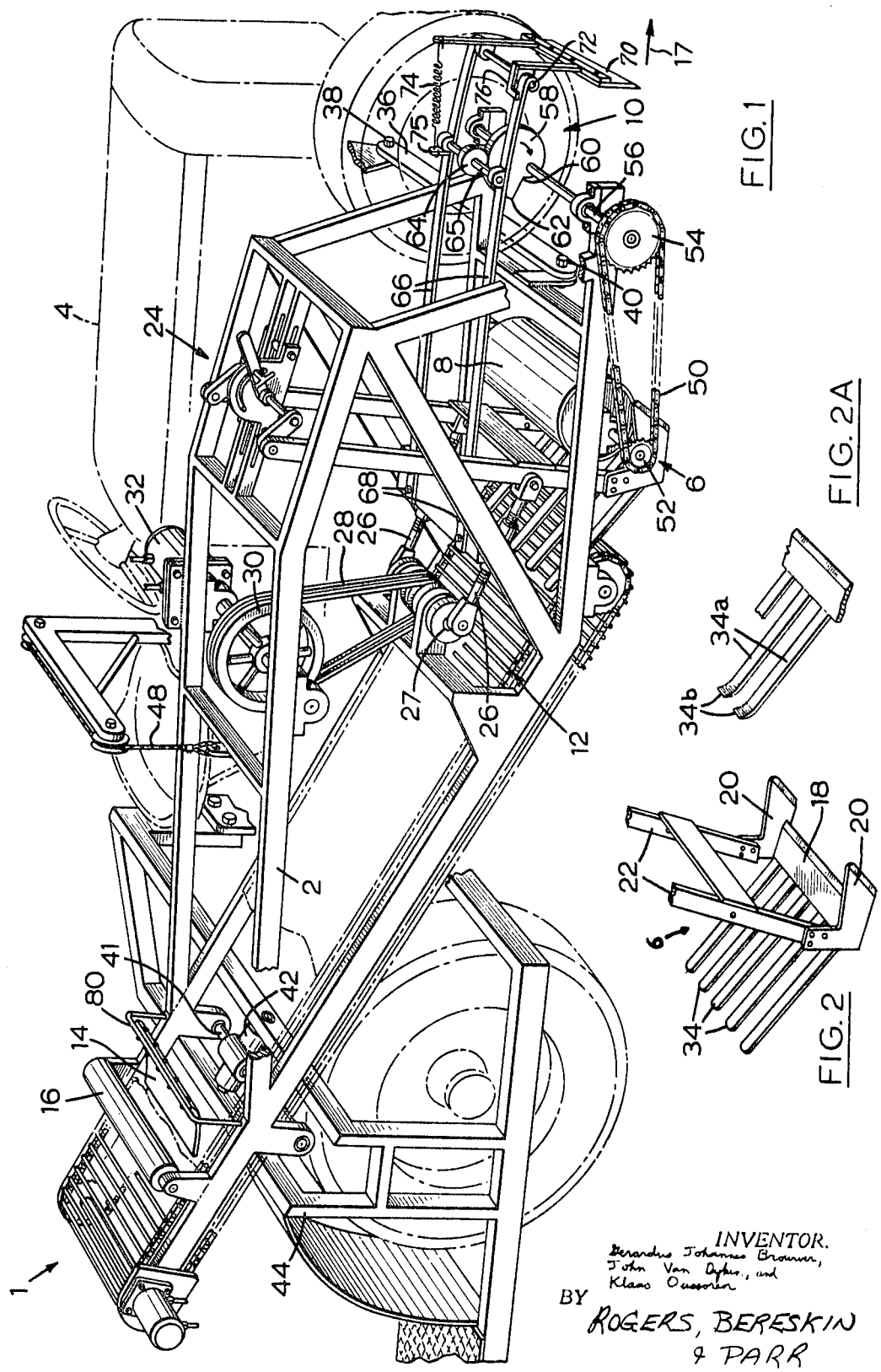

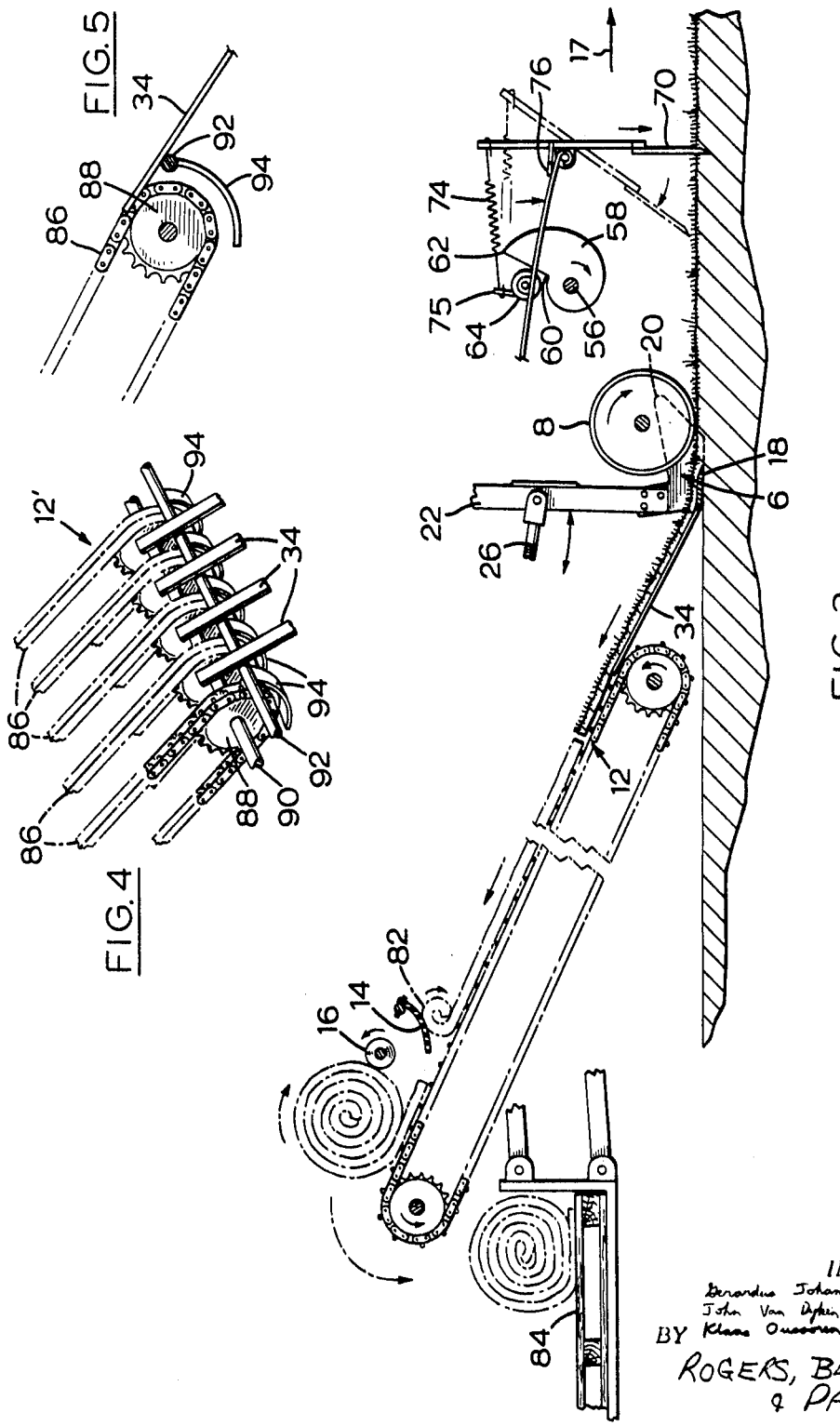

MOUNTING FOR SOD-CUTTING MACHINE

This application is a division of my copending application Ser. No. 560,770 filed June 27th 1966, now U.S. Pat. No. 3,509,944. This invention relates to an improved sod-cutting machine, and more particularly to improved means for mounting a sod-cutting machine on a support and propulsion vehicle.

At the present time, sod is usually cut by means of a machine which has a bottom horizontal blade to sever the sod from the ground at the thickness desired, and two side blades extending vertically one from each side of the horizontal blade to cut the sod to the desired width. Another blade is lowered periodically as the machine passes over the sod, to cut the strips of sod to the desired length. An attendant follows the machine and rolls the cut strips into rolls for transportation to the place of use. This procedure is inefficient and time consuming since a great deal of effort is required to coil the cut strips of sod lying on the ground into rolls, and since further effort is required to load the rolls onto pallets.

Numerous proposals exist for conveying the sod, as it is cut, to a coiling or loading platform, by means of a conveyor mounted immediately behind the cutting blade. Such proposals have generally proved impractical for a number of reasons. Among the reasons is that large wheeled machines carrying conveyor belts have failed to follow the contours of the ground sufficiently accurately when cutting thin sod.

Accordingly, it is an object of the present invention to provide improved mounting means for mounting a sod-cutting machine on a support and propulsion vehicle, to enable the machine more accurately to follow the contour of the ground over which it travels, thus to improve the uniformity of thickness of the sod cut. In a preferred embodiment of the invention, the sod-cutting machine includes a roller to guide it over the ground, and is mounted to a support and propulsion vehicle at a pair of pivot points spaced lengthwise along the sod cutter and located centrally widthwise of the cutting blade. This permits the sod cutter to rock from side to side with its guide roller independently of the support and propulsion vehicle, so that it can follow local variations in the contours of the ground over which it travels.

In the drawings,

FIG. 1 is a perspective view illustrating a sod-cutting machine according to the present invention as mounted on a support and propulsion vehicle:

FIG. 2 is a perspective view of a cutting knife including guide means according to the present invention;

FIG. 2A is a view showing a modification of a cutting knife guide member;

FIG. 3 is a diagrammatic side view illustrating the operation of the cutoff mechanism, the undercutting knife, conveyor and sod-rolling mechanism;

FIG. 4 is a perspective view showing the forward end of a modified conveyor;

FIG. 5 is a side view showing the forward end of the conveyor of FIG. 4;

Figure 6:
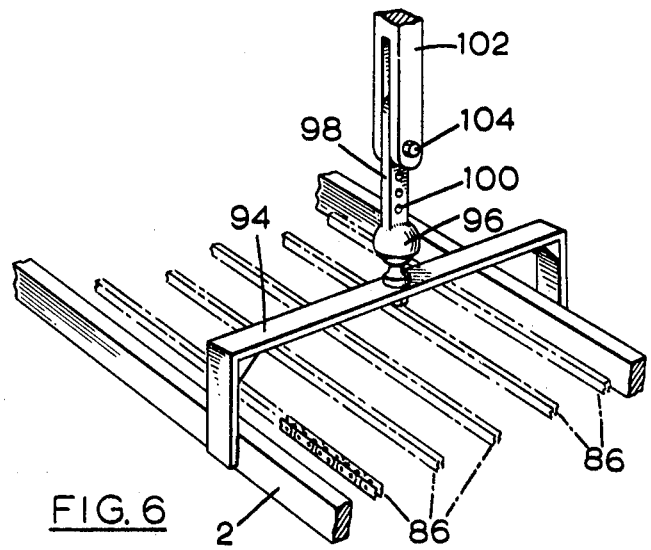
FIG. 6 is a perspective view showing a modified rear mounting arrangement for the sod-cutting machine.

Referring firstly to FIG. 1, there is shown a sod-cutting machine 1 according to the present invention. The sod-cutting machine 1 includes a frame 2 mounted, by means to be described, on a support and propulsion vehicle 4, shown in the present case as a tractor. Mounted on the frame 2 are a sod-cutting knife 6, a guide roller 8, a cutoff mechanism 10 for cutting the strips of sod into desired lengths, a rod conveyor 12 for conveying the cut strips of sod upwardly away from the cutting knife, a rubber sheet 14 for initiating rolling of the sod moving up the conveyor belt once the end of the sod is tipped up, and a stop roller 16 for completing the rolling of the strips of sod. The machine will, in operation, be propelled along a path of travel indicated by arrow 17.

The sod-cutting knife 6, best shown in FIG. 2, includes a horizontal blade 18 for undercutting the sod and two vertical blades 20, one at each side of the horizontal blade, for cutting the edges of the strip of sod. The knife 6 is supported by a pair of arms 22, the arms 22 being connected at their upper ends to a conventional adjusting mechanism 24 for adjusting the depth and angle of the cut to be made by the knife 6.

The cutting knife 6 is vibrated back and forth in a direction parallel to the path of travel of the machine by a pair of arms 26 connected to the arms 22, the arms 26 being eccentrically connected to a drive shaft 27 driven by a belt 28 from a driving wheel 30. In the embodiment shown, the driving wheel 30 is powered by a conventional oil motor 32.

It will be noted that the cutting knife 6 includes guide means comprising a plurality of flat, thin spaced guide strips 34 connected to the horizontal blade 18 and extending rearwardly and upwardly therefrom. These guide strips 34, which may be constituted simply by hacksaw blades (typically about 1 ½inches in width and one-sixteenth inch thickness) welded to the cutting knife 18, extend over and rest loosely on the forward end of the rod conveyor 12. As the sod-cutting machine moves forward along its path of travel, the cutting knife 6, including the guide strips 34, vibrates back and forth and (as best shown in FIG. 3) the cut strip of sod moves over the horizontal blade portion 18, over the guide strips 34, and onto the rod conveyor 12 for travel up the conveyor.

It is found that with the provision of the guide strips 34, travel of the sod from the cutting knife 6 to the conveyor 12 is improved and tearing of the sod is reduced. Because of the space between the thin strips 34, any dirt tending to accumulate on these strips can fall through the gaps between the strips, and in addition, since the strips are thin, there is little possibility of dirt accumulating on the sides of the guide strips. Moreover, use of thin strips adds little weight to the vibrating mass and thus does not increase unduly undesirable vibration of the whole machine.

It will be realized that the guide means constituted by guide strips 34 need not take the form of thin flat strips. For example, round elongated spaced parallel bars could be used instead of strips. Moreover, it may be found desirable, where strips are used, to bend the end of each strip upwardly slightly as shown for strips 34a in FIG. 2A. With such an upward bend, the guide strips will assist in pushing the sod along onto the conveyor 12, and this pushing may be further facilitated by sharpening the free ends 34b of the guide strips 34a.

Reference will next be made to the mounting of the sod-cutting machine 1 on the support vehicle 4 such that the sod-cutting machine will follow closely the contour of the ground over which it runs. To this end, the forward end of the frame 2 is mounted on the tractor 4 by a guide arm 36. The guide arm 36 is connected to the tractor adjacent a front wheel of the tractor, by a pivot 38 which permits the guide arm to move up and down in a vertical plane transverse to the path of travel of the machine and to move slightly from side to side in a direction parallel to the path of travel of the machine. The guide arm 36 is mounted to the frame 2, at a position in front of the guide roller 8, by a pivot 40 which permits the frame 2 (subject to a mounting at the rear of the frame, to be described shortly) to tilt from side to side about a vertical plane extending parallel to the path of travel of the machine and through the center of the frame.

The roller 8 normally carries the weight of the forward end of the frame, and, as indicated in FIGS. 1 and 3, extends substantially across the width of the horizontal blade 18, between the side cutting blades 20.

The rear portion of the frame 2 is mounted to the tractor 4 by a universal joint mounting comprising a horizontal rod 41 oriented across the path of travel of the machine and pivotally connected to the frame 2, and a further rod 42 pivotally connected between the rod 41 and a further frame 44 fixed to the tractor over the tractor rear wheel. The rod 41 provides a horizontal pivotal axis, transverse to the path of travel 17, for the frame 2, so that, subject to the constraint imposed by front guide arm 36, the entire frame can pivot about the rod 41. Thus, when the sod-cutting machine 1 is not in use, it may be lifted by a cable 48 to raise the front end of the machine off the ground (the frame 2 pivoting counterclockwise about the rod 41 at this time), thus permitting convenient movement of the tractor 4 and machine 1 from place to place.

The rear pivot rod 42 and the front pivot 40 are aligned in the same vertical plane extending parallel to the path of travel of the machine and through the center of the frame 2, cutting knife 6, and guide roller 8. The entire sod-cutting machine is thus free to tilt from side to side about this vertical plane.

The guide roller 8, being rigidly (although rotatably) mounted on the frame 2, guides the entire frame, including the cutting knife 6, over the ground as the machine moves along. If, for example, a small hump occurs in the ground at one side of the guide roller, that side of the guide roller will lift, thus lifting the corresponding side of the cutting knife 6, conveyor 12, and the remainder of the sod-cutting and conveying mechanism, so that the strip of sod will be of even thickness instead of being thick at one side and thin at the other.

In other words, as the tractor 4 propels the sod-cutting machine along, the wheels of the tractor will follow the contour of the ground over which they travel (which contour may be different from that encountered by the guide roller 8 and cutting knife 6) but the roller 8 will guide the sod-cutting machine to follow the contour of that narrow strip of ground from which the strip of sod is being cut. This, as mentioned, is due to the fact that the entire frame 2, including the conveyor 12, cutting knife 6, and guide roller 8, can tilt from side to side and up and down as mentioned.

Reference will next be made to the cutoff mechanism 10 for cutting the strips of sod to length. This mechanism includes a measuring chain 50 driven from a sprocket 52 connected to the guide roller 8. The measuring chain 50 drives another sprocket or gear 54 connected to a shaft 56 on which is mounted a cam 58. The cam 58 is shaped generally in the form of a spiral, i.e. its peripheral surface commences at a low point 60 and spirals out to a high point 62, the peripheral surface of the cam then being directed radially inwardly back to the low point 60.

As the cam 58 turns (in the direction of the arrow), it lifts a cam follower 64 mounted on a shaft 65 connected to a pair of leaf springs 66. The leaf springs 66 are anchored at their rearward ends to the frame 2 by any suitable means, such as belts 68, the anchoring being such that the unanchored forward ends of leaf springs 66 are strongly biased downwardly.

A transverse cutting knife 70 is pivotally connected at 72 to the respective forward ends of the leaf springs 66. Because of the pivotal mounting, the transverse cutting knife 70 can tilt to the rear, as shown in dotted lines in FIG. 3, but the knife 70 is normally biased to a vertical position by a coil spring 74 stretched between the knife 70 and a fixed anchor 75 on one of the leaf springs. A strip 76 connected to the transverse cutting knife 70 abuts against one of the leaf springs 66 when the cutting knife 70 is in a vertical position and prevents the coil spring 74 from tilting the cutting knife 70 past its vertical position to a forwardly tilted position.

In operation of the cutoff mechanism, assuming that the length desired for the strips of sod is, for example, 81 inches, the dimensions of the sprockets 52 and 54 are selected with reference to the diameter of the guide roller 8 so that the sprocket 54 and hence the cam 58 is driven through one revolution in every 81 inches of forward travel of the machine. As the cam 58 turns, its spiral cam surface lifts cam follower 64, and consequently the leaf springs 66 to which the cam follower is anchored, together with the transverse cutting knife 70, about the ground. As the cam 58 continues to turn, the discontinuity in its surface between the high and low points 62 and 60 moves past the cam follower 64. When this occurs, lifting support for the cam follower is suddenly removed and the pressure of leaf springs 66 then drives the transverse cutting knife 70 downwardly into the ground, as shown in full lines in FIG. 3. The dimensions of cam 58, cam follower 64, cutting knife 70, and the frame 2 at this location are selected such that the cutting knife 70 penetrates at least as far into the ground as the thickness of the sod strip to be cut, which will normally be one-fourth inch to 2 inches.

As the sod-cutting machine continues to move forward, the cutting knife 70 is gradually raised again by continued rotation of the cam 58. Since the raising of the knife 70 is a relatively slow process, the forward movement of the machines causes the knife 70 to tilt rearwardly as shown in dotted lines in FIG. 3, until such time as the knife 70 is lifted high enough to clear the ground, at which time the spring 74 returns the knife 70 to vertical position in preparation for a new transverse cut.

Reference is next made to the means provided for rolling sod travelling up the conveyor 12. This means, as mentioned, comprises a heavy rubber sheet 14. One end of the sheet 14 is pivoted from a support 80 positioned several inches (e.g. about 4 to 5 inches) above the conveyor 12 and transverse to the direction of movement of the conveyor. The free end of the sheet 14 normally rests freely on the conveyor surface at a position spaced along the direction of movement of the conveyor from the support 80. A stop roller 16 is, as mentioned, rotatably mounted several inches (typically about 4 to 5 inches) above the conveyor at a position adjacent the free end of the sheet 14. (These dimensions are for ¼-inch sod).

The operation of the sod-rolling mechanism is as follows. As the sod travels up the conveyor 12 and approaches the rubber sheet 14, the operator tips up the end of the sod. The tipped up end of the sod strikes the rubber sheet 14 and rolling of the sod is initiated, as shown at 82 in FIG. 3. After about one turn of sod has been rolled, continued pressure of the sod on the rubber sheet 14, caused by the motion of the conveyor, lifts the free end of the rubber sheet 14, and the rolled end 82 of the sod passes under the rubber sheet 14 and under the roller 16. Due to gravity, the rolled end 82 of the sod now begins to roll downwardly as the conveyor moves the sod strip upwardly. Further rolling of the sod thus occurs, and movement of the rolling bundle down the conveyor is prevented by the stop roller 16. The roller 16 at this time rotates in the direction of the arrow, due to the friction of the rolling bundles of sod pressing thereon. After the strip of sod is completely rolled, an attendant standing behind the end of the conveyor lifts the bundle off and deposits it on a pallet 84 which is carried by a forklift (not shown) mounted on the rear of the tractor.

Premature rolling of the rolled end 82 is prevented by the pressure of the rubber sheet 14 thereon, so that full rolling of the sod strip will not occur until the rolled end 82 passes out from under the rubber sheet 14 and under the roller 16.

It is of course necessary to provide sufficient upward slant of the conveyor so that the sod will tend to roll itself once its end has been rolled and once this rolled end passes under stop roller 16. In a typical machine built in accordance with the present invention and used to cut sod one-fourth inch in thickness, the length of the conveyor was 76 inches, the difference in height between the front and rear end of the conveyor was approximately 38 inches, and the stop roller 16 was spaced 6 inches along the conveyor from the support 80.

In use, the conveyor 12 will normally be run slightly faster than the forward speed of travel of the machine, so that gaps will occur between the ends of successive lengths of sod, giving the attendant time to remove one rolled length before the next length has rolled itself.

It will be realized that numerous modifications may be made in the machine as just described. For example, instead of a rod conveyor, a chain conveyor 12' may be used, as shown in FIGS. 4 and 5. The chain conveyor 12' comprises, in the embodiment shown in FIG. 4, five heavy chains 86 running at their forward ends around idler sprockets 88 connected by a shaft 90. A guard bar 92 is positioned in front of the forward end of the conveyor, and guard plates 94 run from the guard bar under each sprocket 88. The guide strips 34 from the cutting knife 6 (which guide strips will be four in number where five chains are used) extend over the guard bar 92 at locations between the chains 86, as shown.

In addition, the means for mounting the frame 2 on the support and propulsion vehicle 4 may be varied, so long as the frame can rock from side to side about a vertical plane parallel to the path of travel 17 of the machine and through the center of the cutting knife 6, and so long as the frame can pivot backwards and forwards to permit the front part of the frame to move up and down. For example, the pivots 38 and 40 mounting the guide arm 38 to the vehicle 4 and to the frame 2 may be ball joints instead of pivots, while the rear universal joint mounting may be replaced by a mounting of the type shown in FIG. 6. In the FIG. 6 mounting, a bracket 94 is connected to the frame 2 at any suitable location adjacent the rear of the conveyor, the bracket 94 being positioned above the conveyor sufficiently not to interfere with sod travelling up the conveyor. A ball joint 96 is provided, connected on the one hand to the bracket 94 and on the other hand to an arm 98 containing a number of holes 100. The arm 98 is connected to a support arm 102 (mounted rigidly on the tractor 4) by a bolt 104 which extends through one of the holes 100 and a corresponding hole in support arm 102. In this way, the rear of the conveyor may be adjusted upwardly or downwardly by changing the hole through which bolt 104 extends.

This capability for adjusting the tilt of the conveyor is useful for example on hilly terrain; when cuts are to be made in a downhill direction, the tilt of the conveyor may be increased by moving its rear upwardly, while if cuts are to be made in an uphill direction, the tilt of the conveyor may be reduced. In addition, variations in tilt may be made for optimum performance depending on the nature of the sod being cut, e.g. wet or dry. If desired, a screw adjusting mechanism may be employed in place of the adjustment provided by the bolt 104 and the holes 100 in arms 90. Typical tilts for the conveyor may lie between 20° and 45°, depending on conditions.

It will be realized that the front guide arm 36 need not be mounted ahead of the guide roller 8, but could, for example be mounted behind the roller at about the middle of the conveyor.

Figure 7:
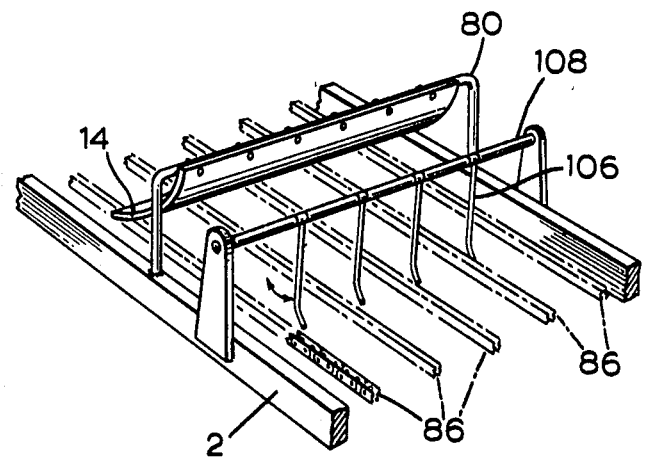
FIG. 7 is a perspective view showing means for tipping up the end of sod strips travelling up the conveyor.

The mechanism for rolling the sod into rolls may be modified, as shown in FIG. 7, so that the end of a sod strip travelling up the conveyor is automatically tipped up to engage the rubber sheet 14, thus eliminating the need for the operator to tip up the end of each sod strip. For this purpose, a row of spaced hooks 106 are provided, strung above the conveyor 12' from a support 108 spaced immediately ahead of the support 80 for the rubber sheet 14. The hooks 106 hang pivotally from the support 108 and extend down between the chains 86 to a position just below the chains. When the end of a sod strip travelling up the conveyor encounters the hooks 106, the end of the sod strip is tipped up. As the sod continues to move, the hooks 106 flip rearwardly and upwardly out of the way, the tipped-up end of the sod strip then engaging rubber sheet 14 which, as before, initiates rolling of the sod and then lifts to permit the rolled end to move under roller 16. It may be noted that the sheet 14 need not be rubber; other relatively heavy and flexible materials will do. However, though the sheet 14 must exert sufficient pressure on the sod to initiate rolling of the sod, this pressure must not be too extreme or the sheet 14 will not lift as desired and will prevent continued upward movement of the sod under the conveyor 16.

Finally, it may be noted that guide roller 8 could be replaced by shoes or runners (provided that the ground were sufficiently well rolled before sod is cut) or could be separated into a number of articulated sections, as desired.

We claim:

1. A sod-cutting machine adapted for travel forwardly along a path of travel and for cooperation with a support and propulsion vehicle, said sod-cutting machine comprising: a frame; a cutting blade; means mounting said blade to said frame in an orientation across said path of travel for said cutting blade to undercut a strip of sod mounting said frame on said support vehicle; means for cutting the edges of said strip of sod; a conveyor mounted on said frame for receiving cut sod and conveying the same upwardly and away from said cutting blade; and mounting means for mounting said frame on said support vehicle, said mounting means comprising
   a. first joint means mounted adjacent the rear of said frame and for connection to said support vehicle, for supporting the rear of said frame on said vehicle,
   b. second joint means mounted forwardly of said first joint means and also for connection to said support vehicle, for restricting lateral movement of the front of said frame relative to said vehicle,
   c. said first and second joint means including means enabling tilting of said frame from side to side about a vertical plane extending parallel to said path of travel and substantially through the center of said cutting blade, thereby causing side-to-side tilting of said cutting blade,
   d. said first and second joint means further including means enabling pivoting of said frame about a horizontal axis through said first joint means and transverse to said path of travel;
and guide means mounted on said frame forwardly of said cutting blade for normally supporting the forward end of said frame and for guiding said frame and said cutting blade over the contours of the ground over which said machine travels, said guide means extending on either side of said vertical plane and being substantially centered about said vertical plane, so that when one side of said guide means is lifted by the ground over which said machine is travelling, the corresponding side of said frame and hence of said cutting blade will also lift, thus to improve the uniformity of thickness of sod cut by said cutting blade.

2. A sod-cutting machine according to claim 1 wherein said conveyor extends upwardly and rearwardly from said cutting blade and said mounting means includes means for adjusting the height of the rear of said frame thus to adjust the slope of said conveyor.

3. A sod-cutting machine according to claim 1 wherein said guide means comprises a roller mounted on said frame rearwardly of said second joint means, said cutting blade being mounted substantially immediately behind said roller.

4. Sod-harvesting apparatus comprising A support and propulsion vehicle for supporting a sod-cutting machine and for propelling the latter along a path of travel 1.said sod-cutting machine adapted for travel forwardly along said path of travel and comprising: a frame, a cutting blade, means mounting said blade to said frame in an orientation across said path of travel for said cutting blade to undercut a strip of sod mounting means for mounting said sod-cutting machine on said support vehicle, means for cutting the edges of said strip of sod, a conveyor mounted on said frame for receiving cut sod and conveying the same upwardly and away from said cutting blade, 2.A support and propulsion vehicle for supporting said sod-cutting machine and for propelling the latter along said path of travel, and mounting means for mounting said frame on said support vehicle,
   3. said mounting means comprising
   a. first joint means located adjacent the rear of said frame and connecting said frame with said support vehicle, for supporting the rear of said frame on said vehicle,
   b. second joint means located forwardly of said first joint means and also connecting said frame with said support vehicle, for restricting lateral movement of the front of said frame relative to said vehicle,
   c. said first and second joint means including means enabling tilting of said frame from side to side about a vertical plane extending parallel to said path of travel and substantially through the center of said cutting knife, thereby causing side-to-side tilting of said cutting blade
   d. said first and second joint means further including means enabling pivoting of said frame about a horizontal axis through said first joint means and transverse to said path of travel;

4. said sod-cutting machine further including a guide roller, and means rotatably mounting said roller on said frame substantially immediately forwardly of said cutting blade with said roller oriented transverse to said path of travel and substantially centered about said vertical plane, said roller extending substantially across the width of said cutting blade, 5. said machine and said vehicle together including lifting means connected between said vehicle and said frame at a position on said frame forwardly of said first joint means, for raising the front end of said frame to lift said guide roller and said cutting blade from the ground, whereby said sod-cutting machine may be moved by said vehicle without said cutting blade or guide roller contacting the ground.

5. A sod-cutting machine according to claim 4 wherein said support and propulsion vehicle is a tractor having front and rear wheels, said first joint means is a universal joint located adjacent a said rear wheel, and said second joint means comprises a rod extending transversely of said path of travel between said frame and said vehicle, first pivot means connecting one end of said rod to the front of said frame for pivotal movement of said rod in a vertical plane transverse to said path of travel, second pivot means pivotally connecting the other end of said rod to said tractor adjacent a said front wheel of said tractor to permit said movement of said rod in said vertical plane transverse to said path of travel, said first and second pivot means permitting limited movement of said rod in a direction parallel to said path of travel to allow vertical movement of the front of said frame.

6. A sod-cutting machine according to claim 4 wherein said conveyor extends upwardly and rearwardly from said cutting blade, and said first joint means comprises a bracket connected to said frame adjacent the rear of said conveyor, said bracket extending across said conveyor at a position above sod travelling up said conveyor, and connecting means including a universal joint adapted to be connected between said bracket and said vehicle.

7. A sod-harvesting apparatus according to claim 4 wherein said means for cutting the edges of said sod is constituted by a pair of vertically oriented side cutting knives, one fixed to each side of said cutting blade, said side cutting knives extending forwardly from said cutting blade, said roller being located between said side cutting knives.